United States Patent [19]
Boothroyd et al.

[11] Patent Number: 4,506,345
[45] Date of Patent: Mar. 19, 1985

[54] DATA ALIGNMENT CIRCUIT

[75] Inventors: Donald C. Boothroyd, Phoenix; Robert W. Norman, Jr., Glendale, both of Ariz.

[73] Assignee: Honeywell Information Systems Inc., Phoenix, Ariz.

[21] Appl. No.: 394,951

[22] Filed: Jul. 2, 1982

[51] Int. Cl.³ .................. G06F 15/00; G06F 13/00
[52] U.S. Cl. .................................. 364/900; 377/54; 377/81
[58] Field of Search ... 364/200 MS File, 900 MS File; 377/54, 64, 81

[56] References Cited

U.S. PATENT DOCUMENTS

| | | | |
|---|---|---|---|
| 2,930,028 | 3/1960 | Johnson et al. | 364/900 |
| 3,436,737 | 4/1969 | Iverson et al. | 364/900 |
| 3,535,694 | 10/1970 | Anacker et al. | 364/200 |
| 3,916,388 | 10/1975 | Shimp et al. | 364/200 |
| 3,969,704 | 7/1976 | Liebel, Jr. | 364/900 |
| 3,988,601 | 10/1976 | Perry | 377/54 X |
| 4,023,023 | 5/1977 | Bourrez et al. | 364/200 |
| 4,109,310 | 8/1978 | England et al. | 364/200 |
| 4,131,940 | 12/1978 | Moyer | 364/200 |
| 4,141,005 | 2/1979 | Bonner et al. | 364/200 |
| 4,181,976 | 1/1980 | Collins et al. | 377/54 X |
| 4,219,874 | 8/1980 | Gusev et al. | 364/200 |
| 4,321,665 | 3/1982 | Shen et al. | 364/200 |

Primary Examiner—James D. Thomas
Assistant Examiner—William G. Niessen
Attorney, Agent, or Firm—A. A. Sapelli; L. J. Marhoefer; J. S. Solakian

[57] ABSTRACT

The present invention relates to an alignment network for aligning data words having a plurality of data word formats. A plurality of shifters are utilized, each shifter utilized to shift the corresponding bit of each character. The odd bits, or nonsymmetrical bits across the various data formats are processed by a separate shifter. In this manner, no pre or post processing of the data word is required in the overall shifting operation.

4 Claims, 12 Drawing Figures

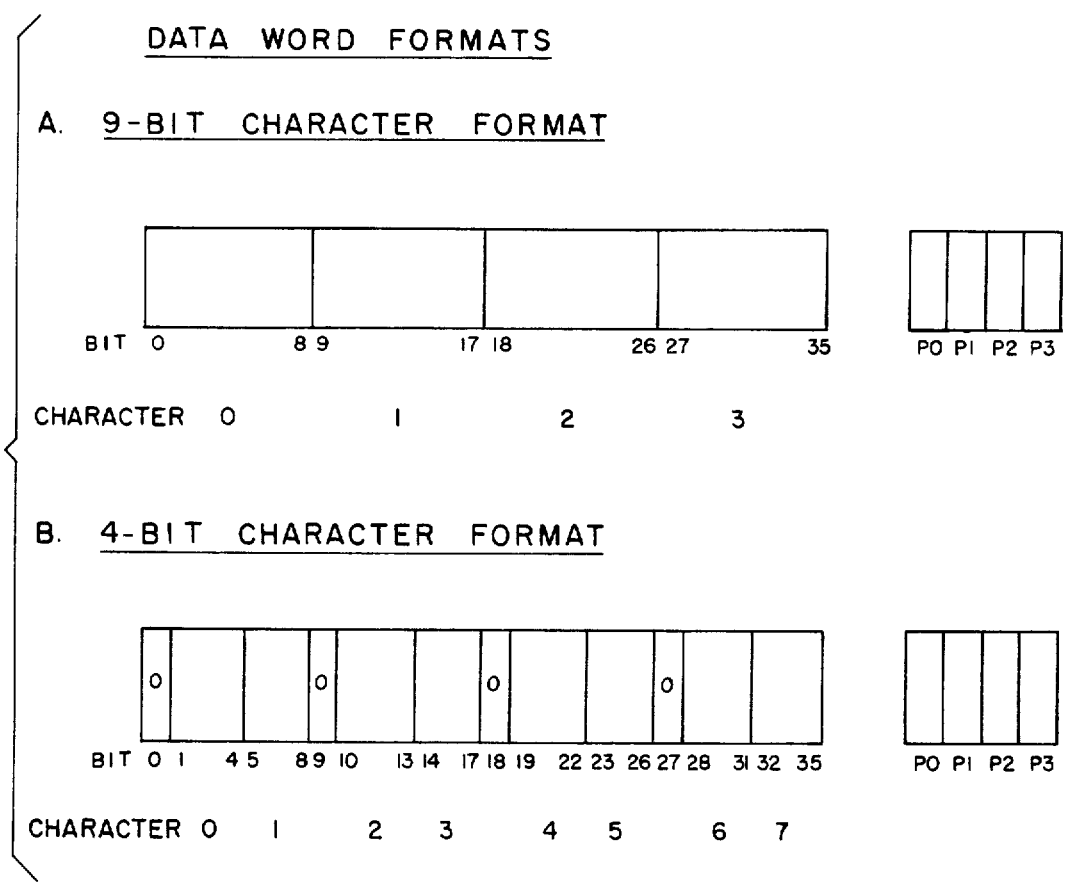
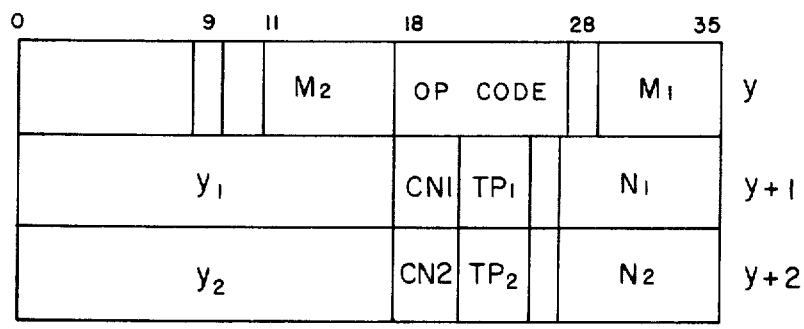
FIG. 2

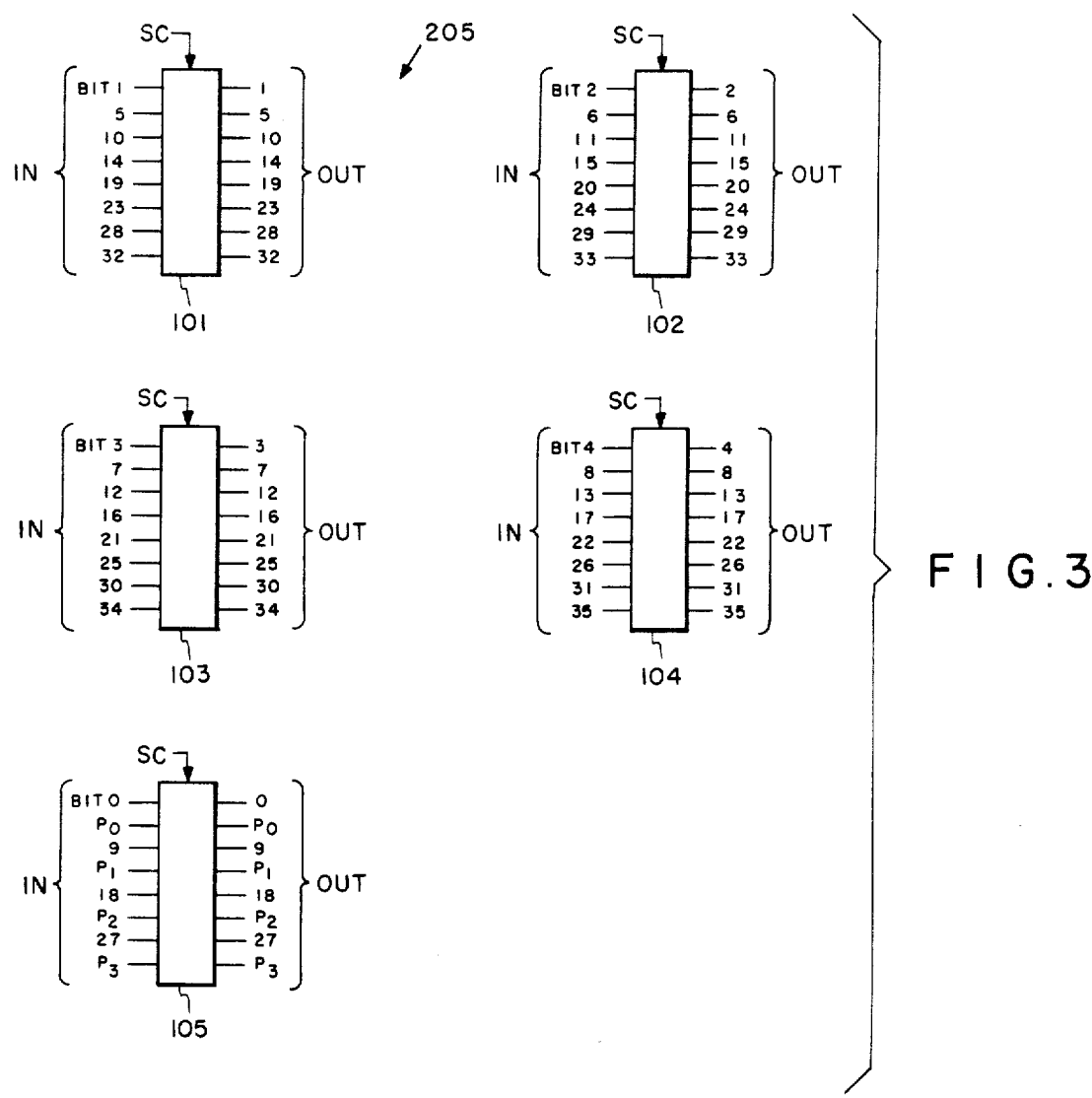
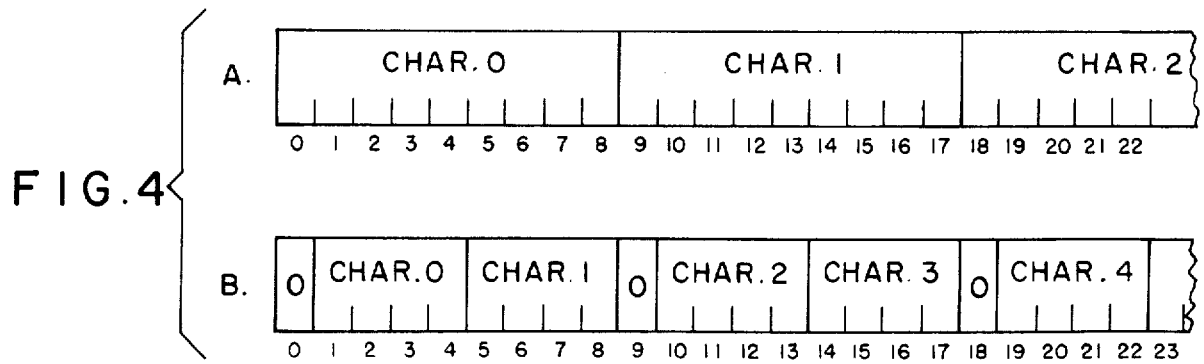
FIG. 3
FIG. 4

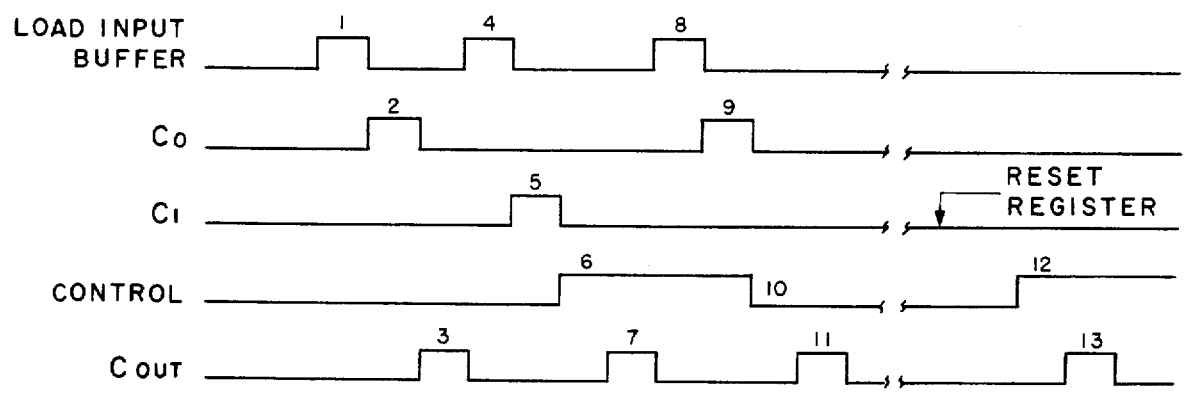
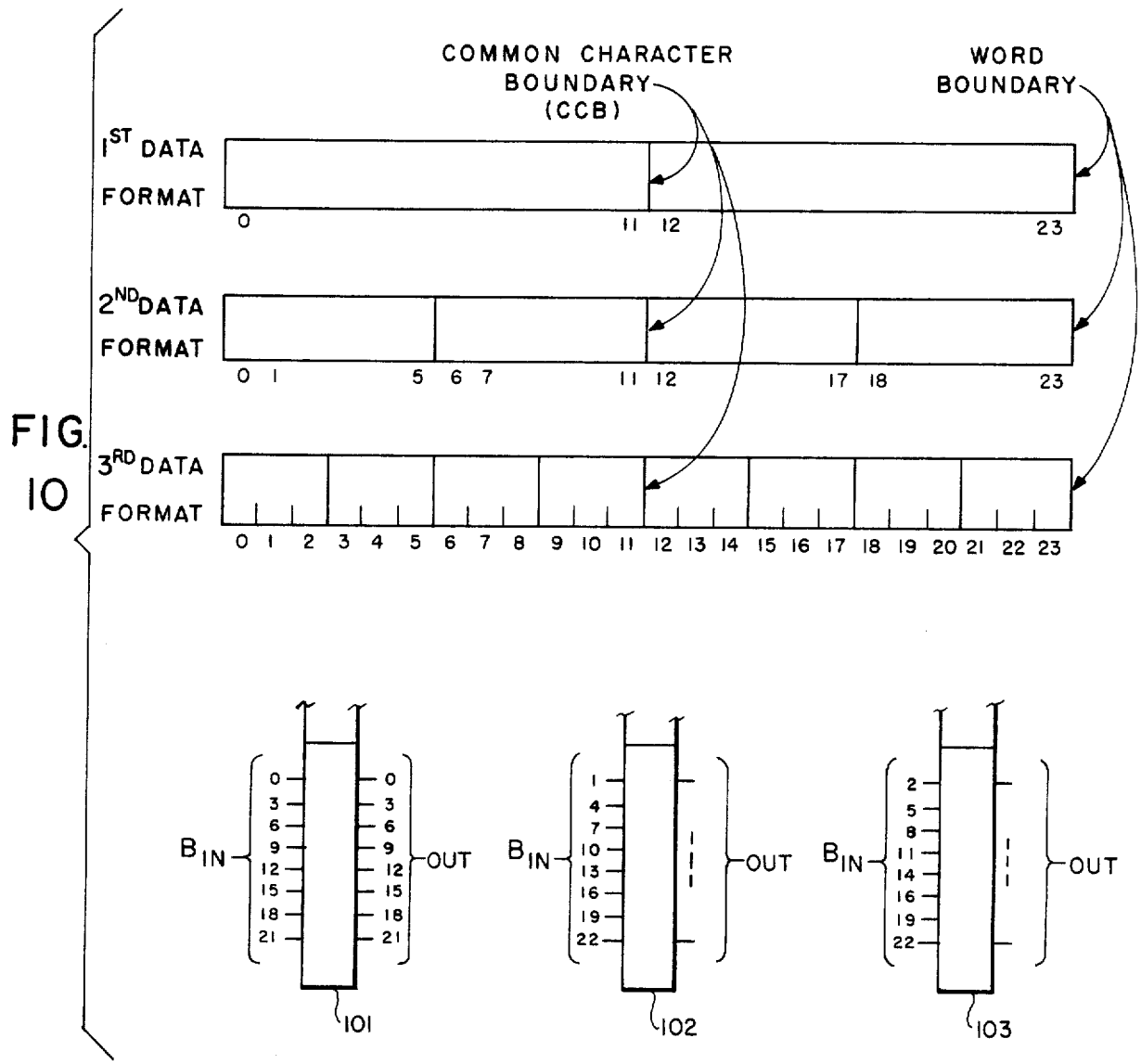

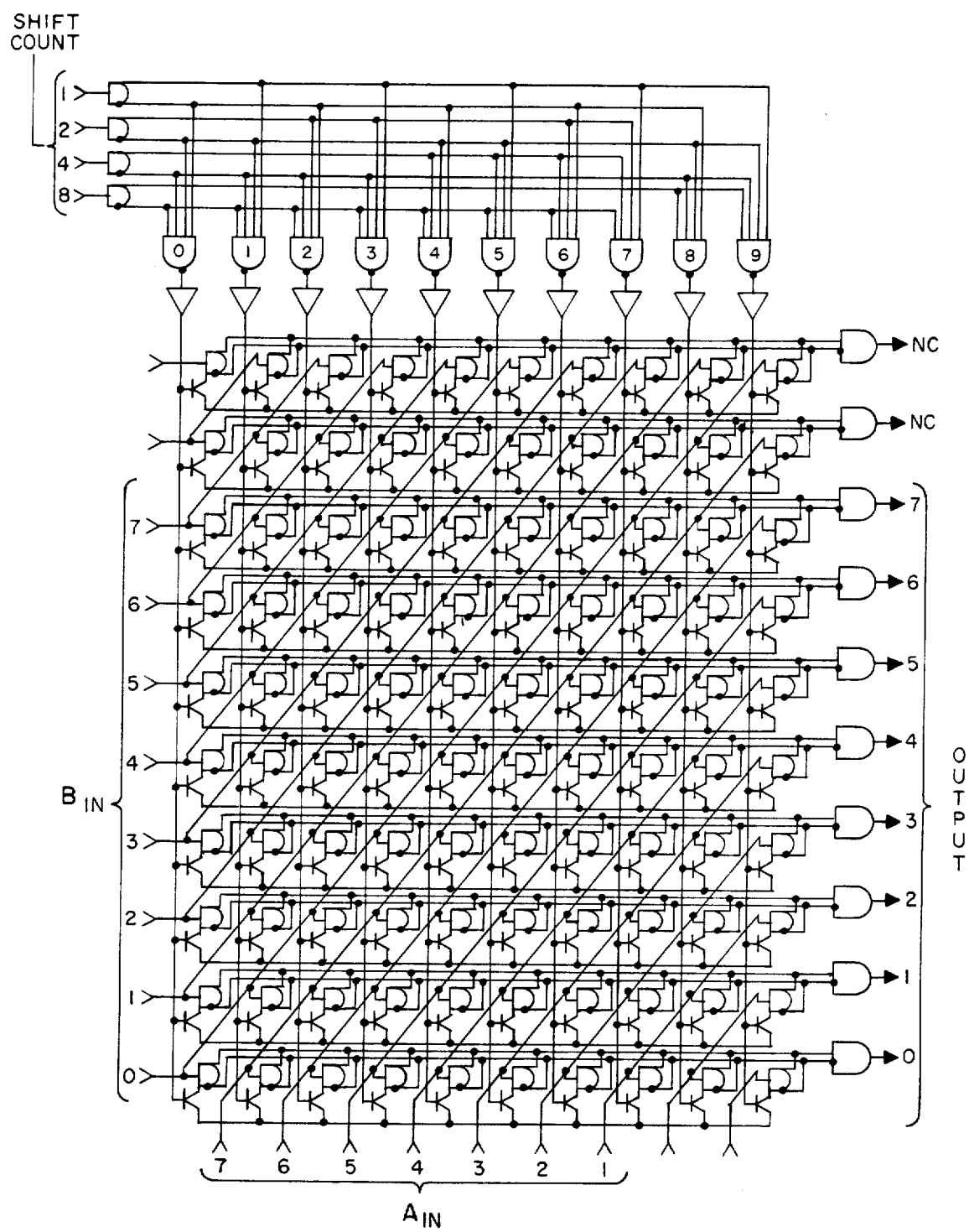
F I G. 12

DATA ALIGNMENT CIRCUIT

RELATED PATENT APPLICATIONS

The present patent application is related to U.S. patent application, Ser. No. 394,952, entitled "Apparatus for Aligning and Packing a First Operand into a Second Operand of a Different Character Size," by Donald C. Boothroyd, et al., filed on even date herewith, and assigned to Honeywell Information Systems Inc., the assignee of the present application.

BACKGROUND OF THE INVENTION

This invention relates to an execution unit of a central processing unit within a data processing or computer system, and more particularly, to a circuit utilized for the execution of data manipulation type instructions including shift and rotate instructions.

In computer systems, various type computer words are defined having specific formats, including instruction words having a specified instruction format and data words having a plurality of predetermined data formats. In order to maximize the efficiency of the overall computer system, the data words can take on a variety of formats. The formats are defined to maximize memory storage efficiency, to minimize the time required for the conversion to an output device format, to maintain the data in a format readily available to the execution units, etc, the data selection being made by the designer to achieve one or more of the aforementioned objectives as they relate to the computer word size.

The various alpha, numeric, and special characters can be defined in a computer in a variety of ways. In many present, existing systems the characters are defined utilizing a grouping of eight bits in a coded format, commonly known as an 8-bit binary coded decimal (BCD) format. This grouping of eight bits allows sufficient capacity to define all the alpha characters, both upper and lower case, the numeric characters, and a variety of special characters, the 8-bit BCD format having achieved a high degree of standardization within the computer industry. In addition, the eight bits are divisible into the standard computer word sizes of many computer systems, these computer systems utilizing 8-bit bytes, or words of 16, 24, or 32 bits. These computer word sizes being divisible by 8 allow for a high degree of symmetry which is highly desirable in data manipulation. Occasionally a data word format is defined which alludes the desired symmetry. When such a case exists extra processing is required in manipulating the data. In large data systems, a computer word size of 36 bits is sometimes defined. In this case, in order to accommodate the 8-bit BCD standard, four characters of 9 bits each can be defined within the 36 bit computer word. A second format can be defined such that the 9 bit character can be divided to include two four-bit numeric characters. In such a format the symmetry mentioned above has been violated such that an extra bit exists in the nine-bit field. In a shifting network utilized for data words having both the nine-bit and four-bit data formats, before the shift operation of the data word having the four-bit format can take place, the characters must be packed without the extra bit, the characters are then shifted, and the shifted data is repacked to comply with the format definition.

In the present invention, a single shifting network is provided which allows the data words of both the four-bit format and nine-bit format to be aligned or shifted without requiring the packing and repacking operations to occur prior to the shifting operation.

SUMMARY OF THE INVENTION

Therefore, there is supplied, in a computer system, having a plurality of predefined computer words, including data words having a plurality of data formats, each data format having a predetermined number of characters within the data word, and each data format having a common character boundary, an alignment network for aligning the data words. The alignment network is comprised of a shift network, having a first set of input terminals, a second set of input terminals, and a set of output terminals, to couple selected ones of the first and second set of input terminals to the output terminals in response to a shift count control signal. The alignment network also includes a register element for temporarily storing at least two contiguous data words of a data block. The register element applies a first data word of two contiguous data words to the second set of input terminals and a second data word of two contiguous data words to the first set of input terminals, thereby affecting an alignment of the data block.

Accordingly, it is an object of the present invention to provide a single device for aligning data words having a plurality of formats.

This and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 1 shows data word formats of the preferred embodiment;

FIG. 2 shows an instruction format computer word of the preferred embodiment;

FIG. 3 shows a general shifter network of the present invention;

FIG. 4 shows an expansion of the partial data words of FIG. 1;

FIG. 9 shows the shift network control timing;

FIG. 10 shows an alternative data word format of a 24-bit computer word;

FIG. 12 shows a logic diagram of the shifter of the preferred embodiment of the present invention.

DETAILED DESCRIPTION

Figure 5:
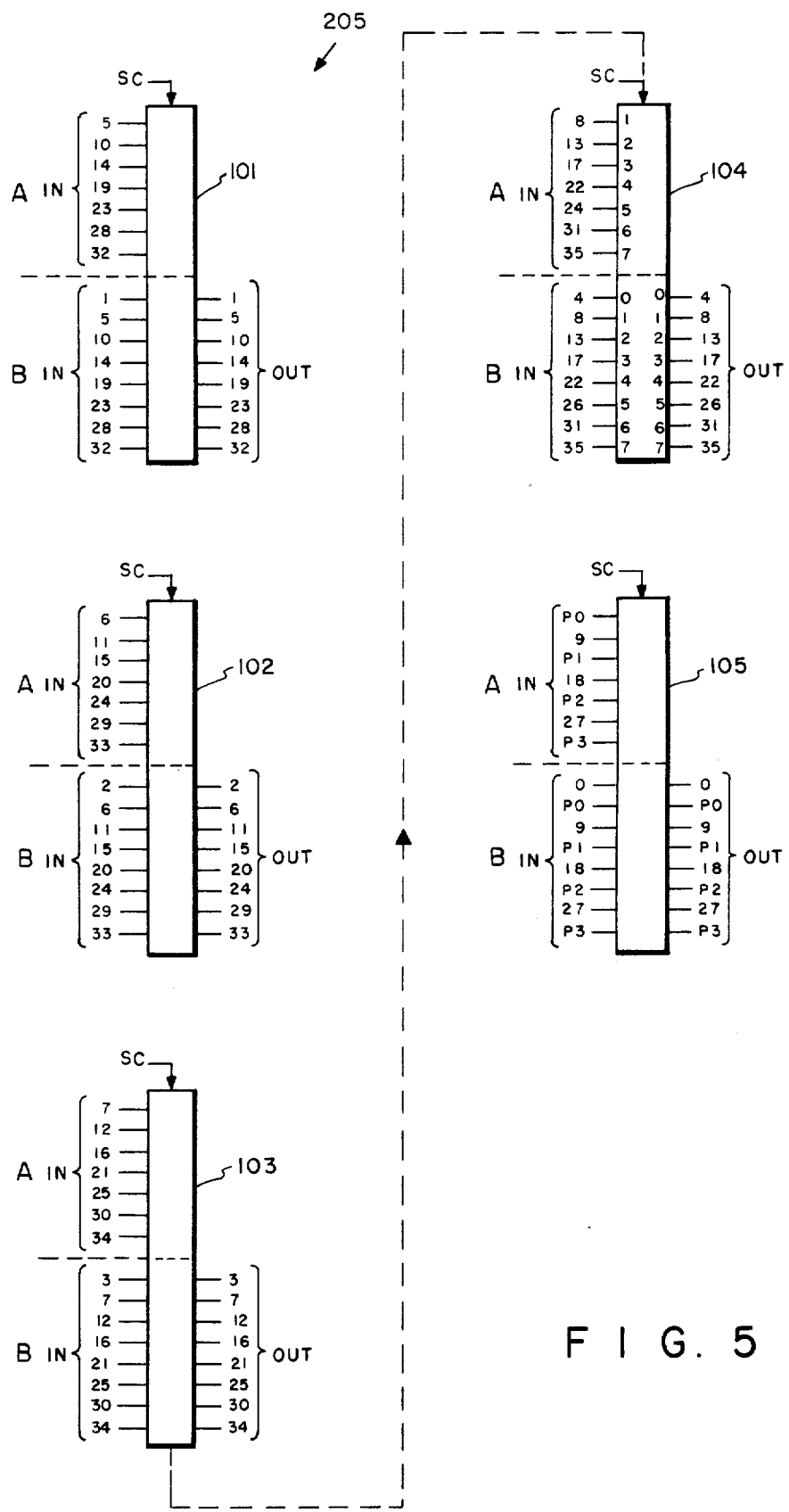
FIG. 5 shows the shifter network of the preferred embodiment.

Referring to FIG. 1, there is shown a 36-bit computer word having a nine-bit character format and a four-bit character format. The nine-bit character format (FIG. 1A) utilizes 9 bits to define a character, bits 0–8, 9–17, 18–26, and 27–35 defining characters 0, 1, 2 and 3, respectively. The four-bit character format (FIG. 1B)

utilizes four bits to define a character, bits 1-4, 5-8, 10-13, 14-17, 19-22, 23-26, 28-31, and 32-35, defining characters 0, 1, 2, 3, 4, 5, 6 and 7, respectively. Characters 0 and 1 of the four-bit character format are defined by dividing character 0 of the nine-bit character format in half. The remaining bit assigned to the high order bit (i.e., the left most bit as shown in the figure), but 0, is essentially a "don't care" or "irregular" bit. Likewise, characters 2 and 3, 4 and 5, and 6 and 7, of the four-bit character format is defined by dividing characters 1, 2, and 3 of the nine-bit character format, respectively, in half. The high order bit, or don't care bit, of the four-bit character format word, bits 0, 9, 18 and 27 can always be set to zero. Four additional bits in both the 9 and 4 bit character formats $P_0$, $P_1$, $P_2$, and $P_3$, can be carried along as the parity bits of respective characters. The "don't care" bit is utilized, in the preferred embodiment, as a parity bit, and will be described in detail hereinunder.

FIG. 2 shows an instruction format computer word of the preferred embodiment. The instruction word is the first word of the grouping and resides in a main memory (not shown) of a computer system at a location y. Two operand descriptor words reside in contiguous locations y+1, and y+2. The instruction word contains the operation code, OP CODE, and two address modifier fields, M1 and M2, for the operand descriptor words. The operand descriptor words contain a field which defines the address of the operand y1, y2, a field which specifies the character number, CN1, CN2, within the data word referenced by the operand address, a field which indicates the number of chracters N1, N2, to be operated upon, and the field indicating the type (i.e., the character format) TP1, TP2 of the data word referenced.

The invention of the present application utilizes a single device to shift the data words of the two character formats of FIG. 1 referenced above. This shifting operation is achieved by utilizing a shifter network 205 comprising five shifter integrated circuit chips generally shown in FIG. 3.

FIG. 4, is an expansion of the partial data words of the preferred embodiment of the nine-bit character format (FIG. 4A) and the four-bit character format (FIG. 4B), including the bit allocations. Referring to FIGS. 3 and 4, the general operation of the shifter network 205 of the preferred embodiment will be described. If character 0 of the four-bit character format were to be shifted one character, bit 1 would be shifted into the bit 5 position. Similarly for a shift of 2, 3, 4 . . . character positions, the bit 1 of character 0 would be shifted to bits 10, 14, 19 . . . respectively. To implement this shift, the first bit (or high order bit position) of all eight characters of the four character format word is input to a first shifter 101 in character order. Hence, bit 1, bit 5, bit 10, . . . , the first bit of characters 0, 1, . . . 7, is coupled to the respective terminals of first shifter 101. Namely, bit 1 is coupled to a first input terminal, bit 5 is coupled to a second terminal, . . . , the first input terminal, second input terminal, . . . being sequential or consecutive input terminal positions of the shifter. Likewise, the second bit of each character of the four-bit character format, bits 2, 6, 11, . . . is input to a second shifter 102 in consecutive order. The third bit position of each character, bits 3, 7, . . . and the fourth bit position, bit 4, 8, 13, . . . is input to the respective third shifter 103 and fourth shifter 104 in consecutive order. Each shifter has a shift count input which causes a bit at an input terminal to shift to an output bit position equal to the number specified by the shift count. The shift count corresponds to the character shift being performed for the four-bit character format.

When a shift of a word having a nine-bit character format is being performed, the shift count to each of the four shifters equals two times the character shifts specified in the instruction words. This shift count is input from a controller (not shown) performing a decode type operation of the instruction words and descriptor words. Hence for the nine-bit character format, a shift of one character requires the shift count to be two. Therefore, by reference to FIGS. 3 and 4 it can be seen that bit position 1 will shift to bit position 10, . . . A fifth shifter 105 is required to handle bit positions 0, 9, 18 and 27. As can be seen from FIG. 3, a shift count of 2 shifts bit 0 into the output bit 9 position, since the coupling of the respective input bit position is to every second terminal of the shifter 105. Further, parity bits $P_0$, $P_1$, $P_2$, and $P_3$, which are the parity bits for the respective characters 0, 1, 2, and 3, are shifted to the parity bit position corresponding to the shifted character, thereby maintaining parity.

Still referring to FIGS. 3 and 4, the preferred embodiment of the four-bit character format utilizes the irregular bit as a parity bit for a character. The parity bits are thereby defined as follows:
(a) bit 0 is the parity bit for character 0,
(b) bit $P_0$ is the parity bit for character 1,
(c) bit 9 is the parity bit for character 2,
(d) bit $P_1$ is the parity bit for character 3,
(e) bit 18 is the parity bit for character 4,
(f) bit $P_2$ is the parity bit for character 5,
(g) bit 27 is the parity bit for character 6, and
(h) bit $P_3$ is the parity bit for character 7.

As discussed above, for a shift of one character the shift count (SC) has a value of 1. This results in bit 0 being shifted to bit position $P_0$, bit $P_0$ being shifted to bit position 9, . . . , hence maintaining character parity of the resultant shifted word.

FIG. 5 shows the shifter network 205 of the preferred embodiment. Each of the five shifters contain both a B input and an A input. Only seven digits are required into the A input since the maximum shift count is seven. Each word to be shifted is applied to the shifter inputs twice, once to the A input and once to the B input. A detailed description of the shifter network 205 in an alignment network will be described hereinunder. Shifter 105 also shows the parity bits input to the A and B inputs. The numbers inside the block of shifter 104 are the sequential input terminal positions of the shifter of the preferred embodiment of FIG. 12.

Figure 6:
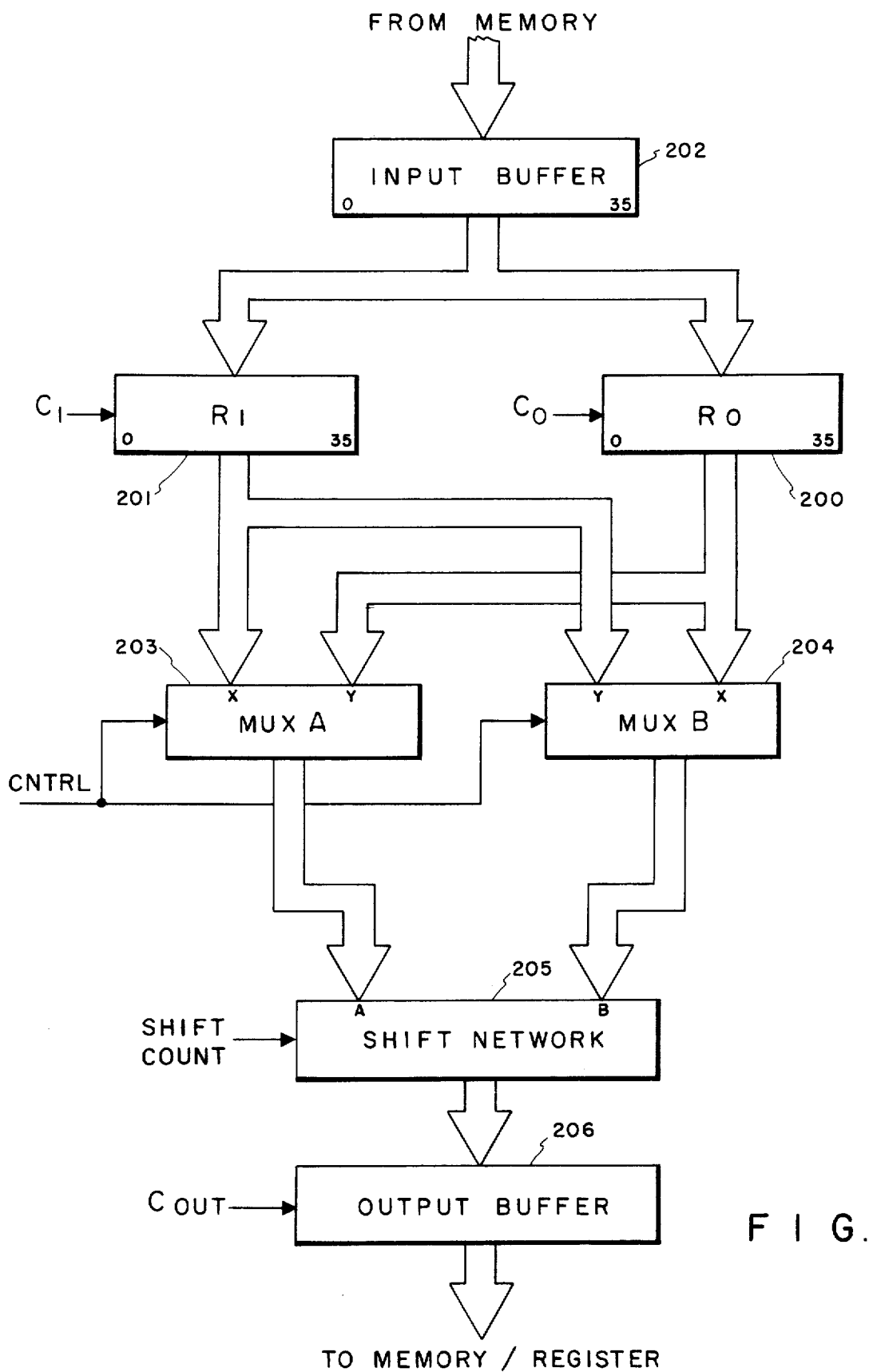
FIG. 6 shows a functional logic diagram of the alignment network of the preferred embodiment of the present invention.

The nine-four bit alignment network of the preferred embodiment will be described in conjunction with FIG. 6. FIG. 6 shows a functional logic diagram of the alignment network. An input buffer 202 of the preferred embodiment receives a 36-bit input word from memory. The output of the input buffer 202 is connected to two 36-bit registers (R1, R0) 201, 200. The output of R1 201 is coupled to the X inputs of a first MUX, MUXA 203, and is further coupled to the Y inputs of a second MUX, MUXB 204. Likewise, the output of R0 200 is coupled to the X inputs of MUXB 204 and is further coupled to the Y inputs of MUXA 203. The output of MUXA 203 is coupled to the A inputs of shift network 205 and the outputs of MUXB 204 is coupled to the B input of shift network 205, the shift network 205 having been described generally above. The operation of the shift network 205 will be described in detail hereinunder. The output of shift network 205 can then be coupled to an output buffer 206 and utilized directly within the processor of the computer system or further coupled to a memory or a register within the computer system. The MUXs are of the general 2×1 MUX type having 36 wide X inputs and 36 wide Y inputs, and are often times referred to as switches.

Figure 7:
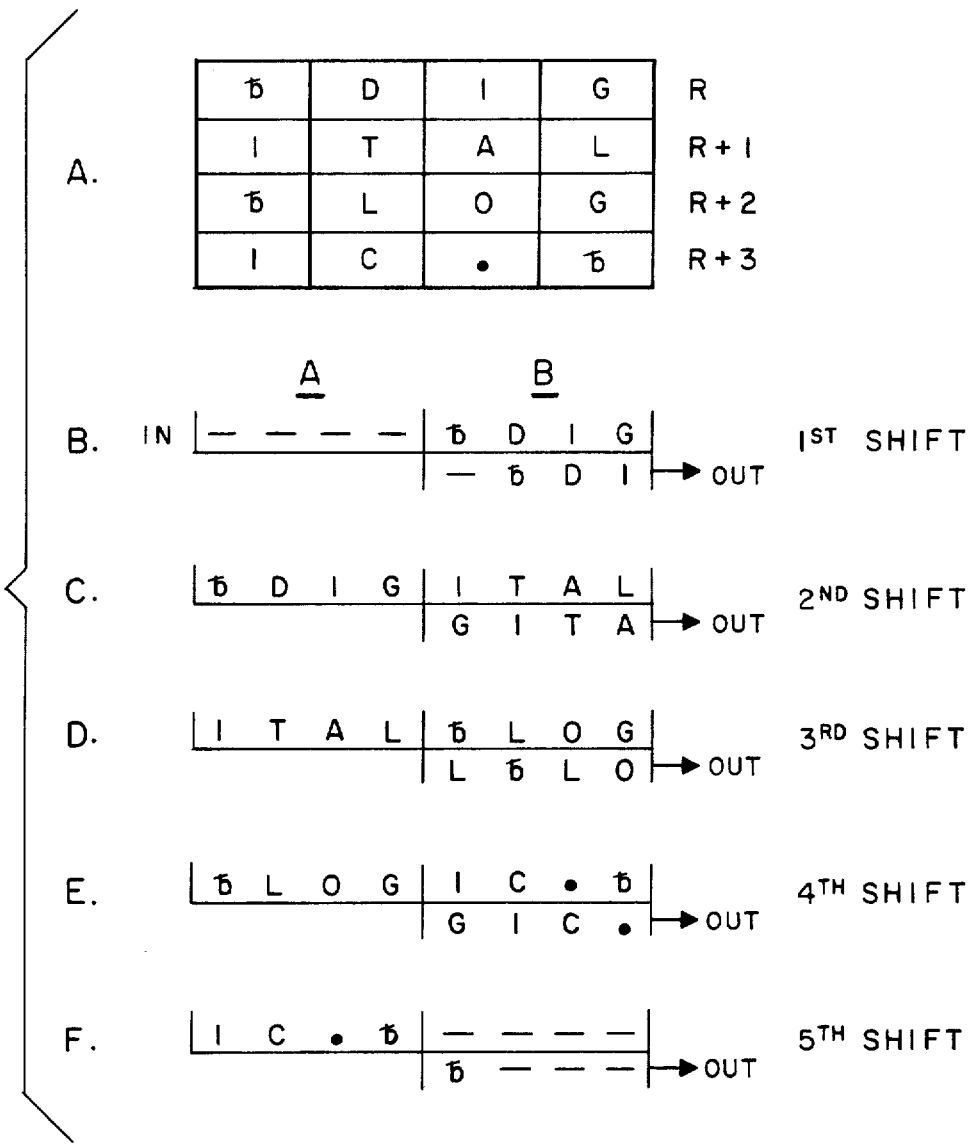
FIG. 7 shows a block of words as they reside in memory and as they go through the plurality of shifting steps.

Before proceeding with an operational description of the alignment network it will be helpful to understand the general function of the operation to be performed. Referring to FIG. 7, assume a data block of four data words of the nine-bit character format resides in main memory (not shown) at locations r, r+1, r+2, and r+3, FIG. 7A. If each character is to be shifted right one character location, the OP CODE would specify a move left to right operation, the type TP1 would specify a nine-bit format, the number of characters would be specified by N1 to be 16 (assuming all the characters of the four words are to be shifted), the field of the descriptor word CN1 would equal 0 specifying character 0 as the character number within the data word referenced, and the field y1 would specify r as the address of the data word. The second descriptor word would indicate the location in memory where the shifted data is to be stored along with the other information as described above. In this example, for a one character shift, CN2 would be specified as 1. The amount of the shift (i.e., the shift count value) is simply the difference in character pointers CN2−CN1. FIGS. 7B–7F show the shift cycles required to shift the four words of FIG. 7A. The first word from memory location r is applied to the B inputs of the shift network 205 and shifted the one character, FIG. 7B. On the next cycle the first word from memory location r is applied to the A inputs and the second word is applied to the B inputs. A one character shift occurs causing the G from the first word to be shifted into the appropriate character location of the second word, all the other characters of the second word being shifted the designated one character position and the output stored, FIG. 7C. The process continues (FIGS. 7D–7F) until all the characters have been shifted the specified one character position to the right. From this example it can be readily seen that each word to be shifted is applied to the shifter inputs twice, once to the A input and once to the B input, as mentioned above.

From the general description of the shifter network 205 discussed above, it can be seen that for a move right to left operation it will be necessary for the configuration of the above described shifters to operate on the words in upper memory first (i.e., r+3), and operate on the words in descending order of memory. Therefore the first word to be read and loaded into R0 200 is the fourth word in memory (r+3). The read reversal is initiated by the controller when the calculated shift count CN2−CN1 is negative. Therefore, the shift network effectively operates as a right shifter. A controller (not shown) generates the necessary control signals based on decoding the OP CODE and performing the necessary operations on the information contained in the various descriptor words. Such controllers, which may be implemented utilizing hardwired logic elements known in the art or utilizing a microprocessor in conjunction with a control store and associated firmware, are well known in the art and are not discussed further herein.

Figure 8:
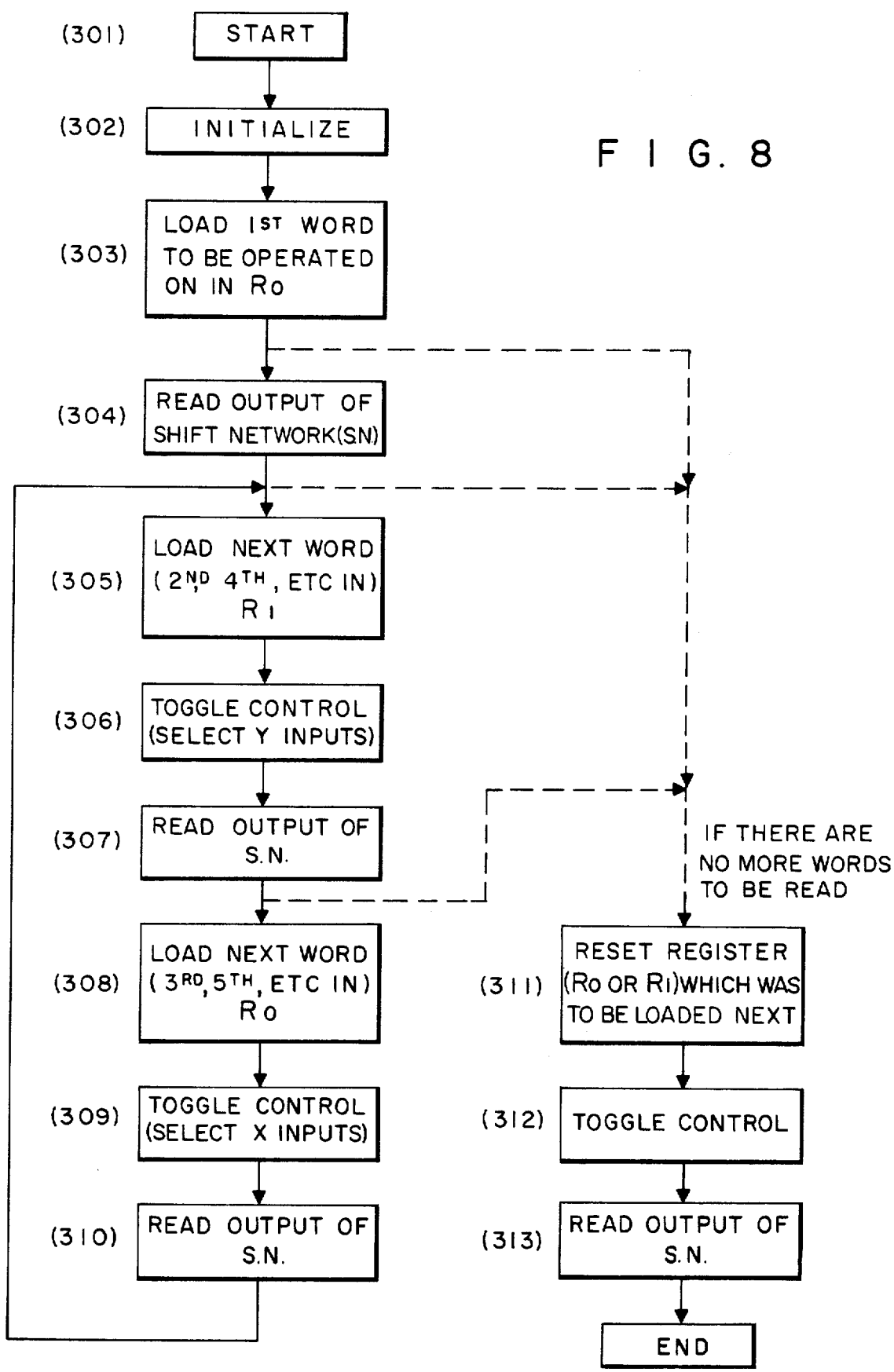
FIG. 8 shows a functional flow diagram of the control signals generated by a controller.

The operation of the nine-four bit alignment network will now be described in conjunction with FIGS. 8 and 9. FIG. 8 shows a functional flow diagram of the control signals generated by a controller (not shown), and FIG. 9 shows the shift network control timing. Once a move left to right operation has been decoded the nine-four bit alignment network is activated and the operation starts (block 301). The nine-four bit alignment network is initialized which includes initialization of the controller (not shown) for generating the necessary control signals required to drive the alignment network, including resetting the appropriate hardware, setting a shift count in the shift network as determined by a controller, resetting control signals $C_0$, $C_1$, and CNTRL, setting the various indexes for the total number of words to be read, and maintaining the address of the current word from main memory (block 302). A pulse (1 of FIG. 9) is generated by the controller (not shown) causing the first word to be operated on by the shift network 205 to be loaded into the input buffer 202 from main memory. Control pulse $C_0$ (2 of FIG. 9) causes the word in the input buffer 202 to be loaded in register R0 200 (block 303). Control pulse $C_{OUT}$ (3 of FIG. 9) causes the output of the shift network 205 to be read (and transferred to a destination), the output of the shift network 205 being the shifted data (block 304). The next word to be operated on is loaded into R1 201 (block 305) under the action of control pulses (4, 5 of FIG. 9). The state of control signal CNTRL is toggled (6 of FIG. 9) or switched such that the Y inputs of MUXA 203 and MUXB 204 are selected. This causes the contents of R0 200 to be coupled to the A inputs of shift network 205 and the contents of R1 201 (which was previously applied to the A inputs of the shift network 205) to now be applied to the B inputs of shift network 205 (block 306). $C_{OUT}$ (7 of FIG. 9) causes the next word of the shifted data to be outputted from shift network 205 (block 307). The next word to be operated on is loaded into register R0 200 (8, 9 of FIG. 9) (block 308). CNTRL is toggled (10 of FIG. 9) to select the X inputs of the respective MUXs 203, 204 (block 309), and the output of the shift network 205 is read (11 of FIG. 9) (block 310). The operation of loading R0 200 and R1 201 alternately continues at block 305 under the action of the control signals. At various points in the operation, a determination is made whether any more words are to be read, namely after block 303, 304, and 307. If no more words are to be read, the next register which would have been loaded had the operation continued is reset (block 311) and CNTRL is toggled (12 of FIG. 9) (block 312). The output of the shift network 205 is read (block 313) (13 of FIG. 9) and the operation is terminated. Although the above discussion describes the control functions of the shifter network 205 in a sequential fashion, it will be understood by those skilled in the art that some of the control functions can be done simultaneously without departing from the spirit or scope of the invention. It will be further understood by those skilled in the art that some of the control functions may be varied (such as the manner for checking the end of the shifting operation) without departing from the spirit or scope of the invention.

In an alternative configuration for demonstrating the principles discussed above, assuming a computer word of 24 bits, having three data formats as shown in FIG. 10. The first data format has two characters of 12 bits, the second data format has four characters of 6 bits and the third data format has eight characters of three bits.

As shown in the drawing bit position 11 is the last bit of a character for each data format and bit position 12 is the first bit position of the next character for all three data formats, denoted herein as the common character boundary (CCB). Bit position 23 is the last bit position of the word for all three data formats and is denoted herein as the word boundary.

Applying the principles discussed above three shifters 101, 102 and 103 will be utilized having eight inputs (B inputs). For a one character shift of the third data format, a shift count of 1 will cause the corresponding bits of a character to be shifted to the corresponding bit positions of the next character. Hence bits 0, 1, and 2 are shifted to bit positions 3, 4, 5, respectively, etc. For the shifting of a word of a second data format, a one character shift will require bit 0 to be shifted to bit 6, bit 1 to be shifted to bit 7, etc. Utilizing the same shifters but utilizing a shift count of 2, it can be seen that bit 0 will indeed be shifted to bit position 6, etc. Likewise, for a one character shift of the first data format, a one character shift will require bit 0 to be shifted to bit 12, etc. Utilizing the same shifters and a shift count of 4 it can be seen that bit 0 will indeed be shifted to bit position 12, bit 1 will be shifted to bit position 13, etc.

Figure 11:
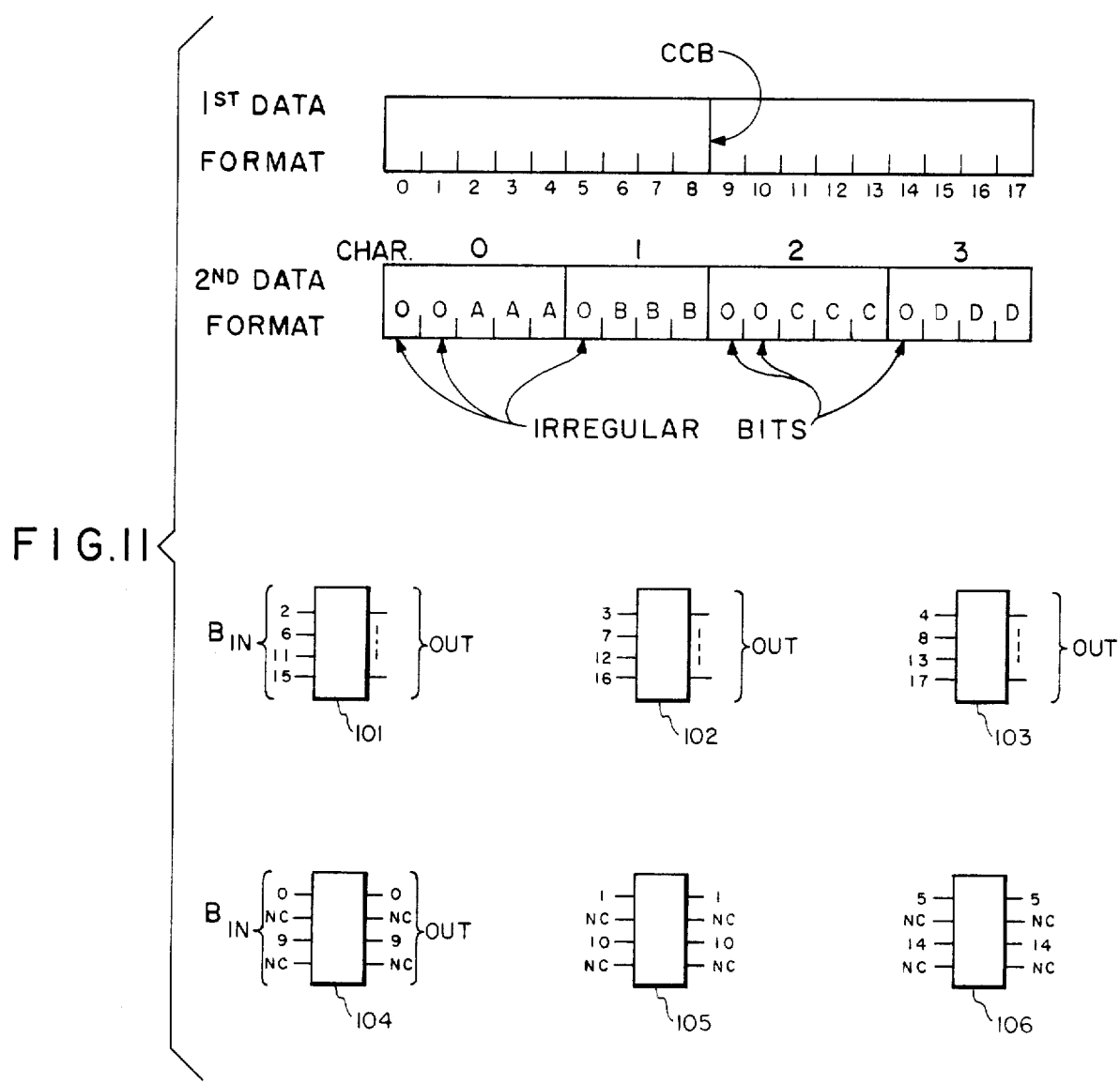
FIG. 11 shows still another alternative data word format of an 18-bit computer word.

In still another alternate configuration for demonstrating the principles discussed above assume a computer word of 18 bits having two data formats as shown in FIG. 11. The first data format has two characters of nine bits each and the second data format has four characters, character 0 having five bits, character 1 having four bits, character 2 having five bits, and character 3 having four bits. The useful information contained in the characters of the second data format is contained in the three bits denoted as A, B, C and D. The zeroes in bit positions 0, 1, 5, 9, 10 and 14 are the "don't care" or "irregular" bits and denoted in the drawing by zeroes. Applying the principles discussed above three shifters 101, 102, 103 are utilized having four inputs (B inputs). For a one character shift it is desired that bit 2 be shifted to bit 6, bit 3 shifted to bit 7 and bit 4 shifted to bit 8. Likewise, for a one character shift position bit 6 will be shifted to bit 11, bit 7 be shifted to bit 12 and bit 8 will be shifted to bit position 13. Accordingly, the inputs for the three shifters 101, 102 and 103 are as designated in FIG. 11. The shift count for a one character shift of the second data format will be a 1. For a one character shift of the first data format bit 2 is to be shifted to bit position 11, bit 3 is to be shifted to bit position 12, bit 4 is to be shifted to bit position 13. By utilizing the same shifter network and a shift count of 2 it can be seen that the one character shift will occur for the first data format. However, bit positions 0, 1, 5, 9, 10 and 14 are not irregular bits in the first data format. Hence, additional shifters 104, 105 and 106 are provided to shift the aforementioned bits of the first character to the corresponding bits of the second character position yielding three shifters having the configuration shown in FIG. 11. The shift count for these three additional shifters, 104, 105 and 106 is also equal to 2. Hence, a single shifting network has been devised which will shift computer words having two different data formats. It can be seen that bits 2 and 5 (and 10 and 14) may be defined as part of the character A and B, respectively (C and D), and thereby do away with defining the respective bit position as irregular. By so defining the characters, even though these bit positions may always be zero or "don't care", the later definition would eliminate one shifter by combining shifters 105 and 106, into a single shifter. Effectively, the formats would then be similar to that of the preferred embodiment discussed above, still requiring shifter 104 in the configuration as shown in FIG. 11. A logic diagram of the shifter 101, 102, 103, 104 and 105 of the preferred embodiment is shown in FIG. 12 and is implemented in Current Mode Logic (CML).

It can be seen that many combinations of computer data word format exist. Applying the above discussed principles it can further be seen that many alternative formats and equivalent shifter configurations can be derived, e.g. shifters can be divided, they can be cascaded, or an equivalent single shifter having a sufficient number of input and output terminals may be implemented to achieve an alignment network of the present invention.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a computer system, which includes a memory for storing at least one data block, said computer system having a plurality of predefined computer words including data words having a plurality of data formats, each data format having a predetermined number of characters within the data word, and each data format having a common character boundary, an alignment network for aligning said data words comprising:

(a) shift network means, having a first set of input terminals, a second set of input terminals, and a set of output terminals, for operatively connecting selected ones of said first and second set of input terminals to said output terminals in response to a shift control signal, said shift network means including n shifters, each shifter having a first grouping of m input terminals, a second grouping of m-1 input terminals, and m output terminals, the m input terminals of all n shifters comprising the first set of input terminals of said shift network means, the m-1 input terminals of all n shifters comprising the second set of input terminals of said shift network means, and the m output terminals of all n shifters comprising the set of output terminals of said shift network means, the first grouping of m input terminals of each shifter adapted to receive corresponding bits of each character in consecutive character order of a first predetermined data word format having the largest number of characters, the second grouping of m-1 input terminals of each shifter adapted to receive corresponding bits of each character in consecutive character order of said first predetermined data word format excluding the corresponding low order bit of each character, and the m output terminals corresponding to the first grouping of the m input terminals such that when the shift count control signal has a value of zero, the data bit applied to the first grouping of m input terminals are coupled unaltered to the m output terminals, n having a value equal to the smallest number of bits utilized to define a single character of said first predetermined data word format, m having a value equal to the number of characters contained in said first predetermined data word format, and said shift count control signal having a value equal to the ratio of the number of characters within the common character boundary of the data word to be shifted to the number of characters within the common character boundary of the first predetermined data word format, multiplied by the number of character locations desired to be shifted.

2. An alignment network, according to claim 1, further comprising:

register means, operatively connected to said first and second set of input terminals, for temporarily storing at least two contiguous data words of said data block, to apply a first data word of said two contiguous data words to said second set of input terminals and a second data word of said two contiguous data words to said first set of input terminals.

3. An alignment network, according to claim 2, wherein said register means comprises;

(a) storage means, operatively connected to said memory, for temporarily storing at least a first and second data word, said first and second data word being contiguous data words of said data block; and (b) switching means, operatively connected said storage means, and operatively connected to said first and second set of input terminals, for coupling said contiguous data words to said shift network means, such that said second data word is coupled to said first set of input terminals and said first data word is coupled to said second set of input terminals during a predetermined cycle, and, said second data word is coupled to said second set of input terminals and the next contiguous data word is coupled to said first set of input terminals during a next sequential cycle.

4. An alignment network, according to claim 1, wherein said register means comprises;

(a) storage means, operatively connected to said memory, for temporarily storing at least a first and second data word, said first and second data word being contiguous data words of said data block; and (b) switching means, operatively connected to said storage means, and operatively connected to said first and second set of input terminals, for coupling said contiguous data words to said shift network means, such that said second data word is coupled to said first set of input terminals and said first data word is coupled to said second set of input terminals during a predetermined cycle, and, said second data word is coupled to said second set of input terminals and the next contiguous data word is coupled to said first set of input terminals during a next sequential cycle.

* * * * *